US009868313B2

(12) United States Patent
Anil et al.

(10) Patent No.: US 9,868,313 B2
(45) Date of Patent: Jan. 16, 2018

(54) TOPCOAT COMPOSITIONS, COATED SUBSTRATES, AND RELATED METHODS

(71) Applicant: Avery Dennison Corporation, Pasadena, CA (US)

(72) Inventors: Vilas Gaikwad Anil, Noord Holland (NL); Ronald Wiegers, 's-Hertogenbosch (NL)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/143,059

(22) Filed: Dec. 30, 2013

(65) Prior Publication Data

US 2014/0186555 A1    Jul. 3, 2014

Related U.S. Application Data

(60) Provisional application No. 61/746,713, filed on Dec. 28, 2012.

(51) Int. Cl.
| | | |
|---|---|---|
| C09D 133/02 | (2006.01) | |
| B41M 5/52 | (2006.01) | |
| C09D 123/08 | (2006.01) | |
| C08L 79/02 | (2006.01) | |

(52) U.S. Cl.
CPC ......... B41M 5/52 (2013.01); C09D 123/0869 (2013.01); C09D 133/02 (2013.01); C08L 79/02 (2013.01); C08L 2312/00 (2013.01)

(58) Field of Classification Search
USPC ....................................................... 524/502
See application file for complete search history.

(56) References Cited

U.S. PATENT DOCUMENTS

| | | | |
|---|---|---|---|
| 3,909,469 A † | 9/1975 | Miller | |
| 5,156,904 A † | 10/1992 | Rice et al. | |
| 5,641,855 A | 6/1997 | Scherr et al. | |
| 5,738,932 A | 4/1998 | Kondo et al. | |
| 5,776,604 A | 7/1998 | Lu et al. | |
| 5,789,123 A | 8/1998 | Cleckner et al. | |
| 5,824,396 A | 10/1998 | Missell | |
| 5,827,627 A | 10/1998 | Cleckner et al. | |
| 5,856,021 A | 1/1999 | Missell | |
| 5,891,552 A | 4/1999 | Lu et al. | |
| 6,075,079 A | 6/2000 | Helmer et al. | |
| 6,277,437 B1 | 8/2001 | Helmer et al. | |
| 6,376,574 B1 | 4/2002 | Helmer et al. | |
| 6,379,787 B1 | 4/2002 | Lu | |
| 6,436,225 B1 | 8/2002 | Papsin et al. | |
| 6,555,207 B2 | 4/2003 | Kondo et al. | |
| 6,660,348 B2 | 12/2003 | Cuch et al. | |
| 6,767,966 B2 | 7/2004 | Berger et al. | |
| 6,783,816 B2 * | 8/2004 | Golub et al. | 428/32.12 |
| 6,794,042 B1 | 9/2004 | Merlin et al. | |
| 6,852,792 B1 | 2/2005 | Capendale et al. | |
| 7,091,276 B2 | 8/2006 | Botros | |
| 7,279,513 B2 | 10/2007 | Zhang et al. | |
| 7,364,800 B2 | 4/2008 | Jesberger et al. | |
| 7,470,736 B2 † | 12/2008 | Cooper | |
| 7,479,470 B2 | 1/2009 | Hiroishi et al. | |
| 7,648,756 B2 | 1/2010 | Cooper | |
| 7,670,389 B2 | 3/2010 | Becker et al. | |
| 7,767,294 B2 | 8/2010 | Cooper | |
| 7,915,334 B2 | 3/2011 | Anderson et al. | |
| 8,198,353 B2 | 6/2012 | Cooper | |
| 9,061,536 B2 | 6/2015 | Wiegers | |
| 9,421,808 B2 | 8/2016 | Ferrar et al. | |
| 2006/0111488 A1 | 5/2006 | Zhang et al. | |
| 2007/0098963 A1 | 5/2007 | Zhou et al. | |
| 2008/0175997 A1 * | 7/2008 | Goldstein et al. | 427/389.8 |
| 2009/0061171 A1 | 3/2009 | Stein et al. | |
| 2009/0061235 A1 | 3/2009 | Cooper | |
| 2009/0162624 A1 | 6/2009 | Stein et al. | |
| 2009/0258204 A1 | 10/2009 | Stein et al. | |
| 2010/0125499 A1 | 5/2010 | Cuch et al. | |
| 2010/0143632 A1 | 6/2010 | Djenadi et al. | |
| 2011/0104441 A1 | 5/2011 | Bhattacharyya | |
| 2011/0129606 A1 * | 6/2011 | Cooper | C09J 123/08 427/261 |
| 2011/0200817 A1 | 8/2011 | Duckworth | |

(Continued)

FOREIGN PATENT DOCUMENTS

| | | |
|---|---|---|
| CN | 1827392 | 9/2006 |
| CN | 200980134765 | 8/2011 |
| CN | 200980147513 | 10/2011 |

(Continued)

OTHER PUBLICATIONS

International Search Report and Written Opinion issued in corresponding International Application No. PCT/US2013/078192 dated Mar. 25, 2014.

(Continued)

*Primary Examiner* — Wenwen Cai
(74) *Attorney, Agent, or Firm* — Avery Dennison Corporation

(57) ABSTRACT

An aqueous based topcoating formulation is provided to coat various substrates such as those used in offset and electrographic printing devices. The water based coating formulation includes ethylene acrylic acid copolymer, polyethyleneimine, and a suitable crosslinker. The formulation exhibits excellent adhesion to substrates and excellent anchorage with different printing inks.

12 Claims, No Drawings

(56) References Cited

U.S. PATENT DOCUMENTS

2011/0236611 A1    9/2011   Servante et al.
2012/0305528 A1   12/2012   Greenberg et al.

FOREIGN PATENT DOCUMENTS

| DE | 20221752 | 5/2007 |
|---|---|---|
| EP | 0782932 | 7/1997 |
| EP | 0807023 | 11/1997 |
| EP | 0804514 | 2/1999 |
| EP | 0 789 281 B1 † | 5/2002 |
| EP | 0925192 | 9/2002 |
| EP | 1273975 | 1/2003 |
| EP | 1204707 | 11/2004 |
| EP | 1812507 | 8/2007 |
| EP | 1777249 | 2/2009 |
| EP | 2194095 | 6/2010 |
| EP | 2253884 | 11/2010 |
| EP | 1769042 | 3/2011 |
| EP | 1937756 | 8/2012 |
| EP | 2355982 | 9/2014 |
| GB | 2476438 | 6/2011 |
| WO | 03/087219 | 10/2003 |
| WO | 2011/100379 | 8/2011 |
| WO | 2013/182444 | 12/2013 |

OTHER PUBLICATIONS

International Preliminary Report on Patentability issued in corresponding International Application No. PCT/US2013/078192 dated Jun. 30, 2015.

\* cited by examiner
† cited by third party

TOPCOAT COMPOSITIONS, COATED SUBSTRATES, AND RELATED METHODS

CROSS-REFERENCE TO RELATED APPLICATION

The present application claims priority to U.S. Provisional Application No. 61/746,713 filed Dec. 28, 2012, which is incorporated herein by reference in its entirety.

FIELD

The present subject matter relates to coating compositions such as topcoat compositions, substrates having coatings of the compositions, and related methods. In particular, the subject matter relates to coatings used in printing and barrier applications.

BACKGROUND

It is well known to apply a primer coating or "topcoat" to a paper or film substrate in order to improve bonding or anchorage of subsequently applied inks, toner, or other materials to the substrate. The formulation of the coating typically depends upon numerous factors such as the nature of the substrate and the printing media, i.e. the inks, toner or other materials. The characteristics of the coating can also depend upon the particular type of printing process to be used in applying the ink or toner. Although numerous types of coatings are known, many of which provide satisfactory performance, a need remains for coating compositions which exhibit improved properties as compared to currently known compositions.

It would also be beneficial to provide primer or topcoat compositions which could be used in association with a variety of different printing processes. For example, in view of the increasing popularity of HP Indigo printing, UV printing, and inkjet printing; it would be desirable to provide a single class of compositions which could be used in all of these processes. That is, although certain compositions may provide satisfactory results for one type of printing process, frequently such results do not extend to use of the same composition to other printing processes.

More specifically, ink anchorage for HP Indigo printing applications is typically poor and difficult to achieve for certain substrates. This is believed to be due to at least two factors. One factor may relate to the type of substrate. For example, it is difficult to achieve good topcoat adhesion to certain substrates such as polypropylene and cast gloss paper. A second factor relates to compatibility difficulties between many inks and the topcoat. For HP Indigo printing techniques, the topcoat must be relatively polar and compatible with the ink to be applied thereto. Therefore, it would be beneficial to provide a topcoat which exhibits good adhesion to substrates such as polypropylene and cast gloss paper; and which is relatively polar and compatible with inks typically used in HP Indigo printing.

SUMMARY

The difficulties and drawbacks associated with previously known compositions and coated substrates are addressed in the present compositions, coated substrates, and methods.

In one aspect, the present subject matter provides a composition comprising 0.01% to 5% of at least one polyethyleneimine, 5% to 50% of at least one ethylene acrylic or methacrylic acid copolymer, 0.001% to 2% of at least one crosslinking agent, and 10% to 95% water.

In another aspect, the present subject matter provides a composition comprising 0.01% to 2% of at least one polyethyleneimine, 25% to 40% of at least one ethylene acrylic or methacrylic acid copolymer, 0.01% to 2% of at least one crosslinking agent, and 50% to 85% water.

In yet another aspect, the present subject matter provides a coated substrate adapted for receiving printing media to be applied thereon. The coated substrate comprises a substrate defining an outer surface. The coated substrate also comprises a layer of a composition disposed on at least a portion of the outer surface of the substrate. The composition includes (i) 0.01% to 5% of at least one polyethyleneimine, (ii) 5% to 50% of at least one ethylene acrylic or methacrylic acid copolymer, (iii) 0.001% to 2% of at least one crosslinking agent, and (iv) 10% to 95% water.

And, in yet another aspect, the present subject matter also provides a method for improving ink or toner anchorage to a substrate and/or barrier properties of the substrate. The method comprises providing a substrate defining an outer surface to receive ink or toner. The method also comprises applying a composition to the outer surface of the substrate. The composition includes (i) 0.01% to 5% of at least one polyethyleneimine, (ii) 5% to 50% of at least one ethylene acrylic or methacrylic acid copolymer, (iii) 0.001% to 2% of at least one crosslinking agent, and (iv) 10% to 95% water. A layer of the composition is formed on the outer surface of the substrate. And, the method also comprises curing the layer of the composition.

As will be realized, the subject matter is capable of other and different embodiments and its several details are capable of modifications in various respects, all without departing from the subject matter. Accordingly, the description is to be regarded as illustrative and not restrictive.

DETAILED DESCRIPTION OF THE EMBODIMENTS

The present subject matter provides compositions which can be used as primer coatings or topcoats which are applied to substrates. After application and curing, the compositions provide a receiving surface for subsequently applied printing media, for example toner and/or inks. In certain versions of the present subject matter, the compositions increase bonding and/or anchorage of the toner or ink to an underlying substrate.

Generally, the compositions are aqueous and comprise (i) one or more polyethyleneimines, (ii) one or more ethylene acrylic (or methacrylic) acid copolymers, and (iii) one or more crosslinking agents. The compositions may optionally further comprise one or more additives for example buffer agents, anti-blocking agents, wetting agents, defoamers, matting agents, antistatic agents, surfactants, and combinations thereof. The present subject matter includes the use of other agents and/or additives.

In certain versions of the present subject matter, the following proportions of components are utilized in an aqueous, i.e. water-based, composition, as noted below in Table 1. All percentages noted herein are percentages by weight unless indicated otherwise.

TABLE 1

Proportions of Components in Representative Compositions

|  | Polyethyleneimine(s) | Ethylene Acrylic Acid Copolymer(s) | Crosslinking Agent | Water |
|---|---|---|---|---|
| Typical Formulations | 0.01%-5% | 5%-50% | 0.001%-2% | 10%-95% |
| Particular Formulations | 0.01%-2% | 25%-40% | 0.01%-2% | 50%-85% |

Details as to the various components used in the compositions of the present subject matter are as follows.

Polyethyleneimine(s)

Polyethyleneimine is also known as poly(iminoethylene) or polyaziridine or poly[imino(1,2-ethanediyl)]. Polyethyleneimines are either linear or branched. Linear polyethyleneimines contain all secondary amines, in contrast to branched polyethyleneimines which can contain primary, secondary, and tertiary amino groups.

A wide array of polyethyleneimines can be used in the compositions of the present subject matter. For example, it is contemplated that the one or more polyethyleneimine(s) can be linear, branched; can include alkoxylate groups, silane groups; and/or be hydroxylated. In certain versions of the compositions, a formulation of 5% polyethyleneimine in water available from Mica Corp. of Shelton, Conn., USA under the designation AJ-131-X, is useful. The reference of "5%" refers to 5% polyethyleneimine solids in water. It will be understood that other formulations including one or more polyethyleneimine(s) may be used. For example, certain polyethyleneimine products from BASF may also be utilized.

Ethylene Acrylic (or Methacrylic) Acid Copolymers

A wide array of ethylene acrylic (or methacrylic) acid copolymers can be used in the compositions of the present subject matter.

In certain versions of the subject matter, an ethylene acrylic acid copolymer from Michelman, Inc. of Cincinatti, Ohio, USA, available under the designation MP 4990 has been found to be useful. The MP 4990 product includes 35% ethylene acrylic acid copolymer solids in water. It will be appreciated that the present subject matter includes a wide range of ethylene acrylic (or methacrylic) acid copolymers and related products varying in type of copolymer and percentage solids. For example, other commercially available products containing lower solids content can be used such as 25% solids. The use of higher solids content products is also contemplated.

The ethylene acrylic (or methacrylic) acid copolymers used in the present subject matter compositions typically have a molecular weight of from about 2000 to about 100,000; and generally from about 2000 to about 50,000.

The ethylene acrylic (or methacrylic) acid copolymers typically include from 60% to 95% ethylene and from 5% to 35% acrylic acid or methacrylic acid. However, it will be appreciated that the present subject matter includes copolymers having proportions of ethylene, acrylic acid, and/or methacrylic acid greater than or lesser than these amounts.

In certain versions of the present subject matter, it may be desirable that the coating exhibit a relatively high degree of flexibility and thus be amorphous. Generally, higher amounts of acrylic or methacrylic acid lead to increased flexibility and amorphous nature. Increased levels of acrylic or methacrylic acid also increase polarity within the composition which promotes adhesion. Furthermore, higher levels of acrylic or methacrylic acid typically result in higher temperature hot tack which is desirable for HP 4000 series equipment utilizing a blanket temperature of 140° C. In addition, greater amounts of acrylic or methacrylic acid provide a greater number of crosslinkable sites which improves adhesion and water resistance of the resulting coating.

Generally, higher concentrations of ethylene in the copolymer provide improved water resistance. The use of branched polyethylene will additionally improve the flexibility and compatibility with polyethylene films which can provide improved processing advantages. These advantages can eliminate or at least reduce blocking issues which may otherwise occur.

Generally, ethylene segments in the ethylene acrylic (or methacrylic) acid copolymers provide properties such as increased water resistance, flexibility, crystallinity, chemical resistance and barrier properties. Long straight polyethylene chains are highly crystalline (>90% crystalline) in nature, which results in a regular packing arrangement. This is readily explained by the facility with which long polyethylene chains can align with each other.

Generally, acrylic acid imparts polarity, toughness, crosslinkability, hot tack strength, low temperature heat seal in the resulting coating. The presence of acrylic (and/or methacrylic) acid in the copolymer reduces the crystallinity of ethylene segments. Increasing the acrylic (and/or methacrylic) acid in the copolymer will result in the formation of more amorphous regions, thereby disrupting the formation of crystals. Just as the increased branching in low density polyethylene (LDPE) reduces the crystallinity of polyethylene, so will the presence of acrylic (or methacrylic) acid. Furthermore, increasing the content of acrylic acid will also increase adhesion of the coating to polar substrates, decrease softening and melting points, improve optics and increase the strength of the coating.

Suitable ethylene acrylic (or methacrylic) acid copolymers, or dispersions of such copolymers in an aqueous vehicle, are commercially available from Michelman, Inc.; Paramelt B.V. of the Netherlands; and Dow Chemical.

Crosslinking Agents

Various crosslinking agents can be utilized in the present subject matter.

In certain versions of the present subject matter, an aziridine based crosslinking agent can be used. An example of such agent is CX 100 available from various suppliers.

A wide array of crosslinking agents can be used. For example, various aziridine based, carbodiimide based, epoxy based, and/or diamine oligomers or monomers can be used instead of the noted crosslinking agent or in combination with the noted crosslinking agent. Multifunctional isocyanates can also be used as crosslinking agent(s).

Crosslinking agents are available from various suppliers such as DSM Neoresins of Wilmington, Mass., USA; and Stahl Holland, B.V.

Alternative Embodiments

Alternatively, instead of using one or more of polyethyleneimine(s), ethylene acrylic (or methacrylic) acid copolymers, and/or crosslinking agents; the present subject matter also includes the use of one or more of amine end capped polyurethane and related amine-extended polyurethanes, ethylene vinyl acetate, vinyl acrylates, and vinyl carboxylic acid(s) and copolymers thereof. Nonlimiting examples of amine end capped polyurethanes include R-600 and/or R 563 available from DSM. Nonlimiting examples of vinyl acrylates include VYCAR® Emulsions available from Lubrizol. In certain embodiments, it is contemplated to utilize vinyl acrylates and in particular emulsion systems of such for example the noted VYCAR® systems in combination with ethylene acrylic (or methacrylic) acid or separately to provide a composition for solvent inkjet printable.

Optional Additives

The present subject matter compositions can include a range of additives such as but not limited to buffer agents, anti-blocking agents, wetting agents, defoamers, matting agents, antistatic agents, surfactants, and combinations thereof. It is contemplated that various colorants, pigments, dyes and similar agents can be included in the compositions of the present subject matter.

In certain versions of the present subject matter, a buffer agent is used to adjust or control pH of the coating composition. For example, a citrate buffer agent can be utilized. A citrate solution including sodium citrate, i.e. Na(II) citrate, can be used. Such a solution serves as a buffer to maintain the pH of the coating composition such as for example between 8 and 9. At pH levels greater than 9, the resulting composition, typically in the form of a dispersion, may not be stable. Although not wishing to be bound to any particular technique, pH of the resulting composition can be increased by adding effective amounts of ammonia to the ethylene acrylic acid copolymer component. Alternatively, pH can be reduced by appropriate formulating techniques of the polyethyleneimine component.

Buffer or buffering agents are available from suppliers such as Sigma Aldrich of St. Louis, Mo., USA.

Antiblocking agents are available from Paramelt and under the designation AQUASAFE from Nazdar Ink Technologies of Shawnee, Kans., USA, for example.

Wetting agents are available from Ashland Inc. of Ashland, Ky., USA and Lubrizol Corp. of Cleveland, Ohio, USA.

Defoamers are available from Ashland and Michelman.

Matting agents are available from Evonik Industries of Germany; Rhodia a member of Solvay Group Worldwide; and AKZO Nobel.

Antistatic agents are available from Akzo and Croda of Yorkshire, UK.

Compositions

The compositions of the present subject matter generally include water with a total solution solids content of about 10%. However, it will be appreciated that the proportion of solids dispersed in water can vary depending upon a host of factors such as coating technique, substrate characteristics, and environmental factors. The present subject matter includes the use of compositions having a total solution solids content of less than 10%.

The compositions as described herein include water and in many embodiments, include a majority proportion of water. Water serves as a vehicle for the various components, i.e. the polyethyleneimine(s), ethylene acrylic (or methacrylic) acid copolymer(s), and the crosslinker(s). However, the present subject matter includes the use of other vehicles and/or solvents in the compositions such as for example organic agents and a wide array of alcohols.

Coatings

As previously noted, the present subject matter also includes coatings or layers which are deposited or otherwise formed on substrates. For a coating composition having 10% solids, a dry coatweight for polymeric film substrates can for example range from about 0.3 gsm to about 0.5 gsm. For paper substrates, a coating composition having 25% solids can be used to form a dry coatweight ranging from about 0.8 gsm to about 1.2 gsm.

After application of the composition to a substrate, the composition is cured. Typically, curing is performed by drying the applied or deposited composition to remove water and/or other vehicles and then subjecting the composition to a crosslinking operation. Drying and crosslinking can be performed sequentially or concurrently. Typically, water is removed by heating such as by use of a convection oven, an air flow oven, and/or by an NIR oven. The temperature range within such ovens is typically between 45° C. and 70° C.

Crosslinking can be performed by several techniques. Typically, crosslinking is achieved by heating the composition and removing water from the composition. In certain versions of the present subject matter, crosslinking can be performed or initiated during or after drying and triggered by a change in pH from alkaline to acidic. Typically, this occurs during drying. The change in pH can result due to evaporation of ammonia or other neutralizing agent from the composition.

Substrates

The various compositions can be applied to regions or faces of substrates and cured to provide a coating, layer, or other surface having desired properties such as improved ink anchorage. Nonlimiting examples of substrates include paper substrates, polymeric film substrates, and composite substrates that include paper and film components.

Paper substrates are particularly useful because of the wide variety of applications in which they can be employed. Any type of paper having sufficient tensile strength to be handled in conventional paper coating and treating equipment can be employed as the substrate layer. Thus, any type of paper can be used depending upon the end use and particular personal preferences. Included among the types of paper which can be used are paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are typical. The term "ream" as used herein equals 3000 square feet. Examples of specific papers which can be utilized as substrates in preparing the coated substrates of the present subject matter include 41-pound offset grade bleached Kraft; 50-pound bleached Kraft paper, etc.

Generally, the polymeric film materials may be selected from polystyrenes, polyolefins, polyamides, polyesters, polycarbonates, polyvinyl alcohol, poly(ethylene vinyl alcohol), polyurethanes, polyacrylates, poly(vinyl acetates), ionomers and mixtures thereof. In a particular embodiment, the polymeric material is a polyolefin such as polyethylene or polypropylene.

Other materials for the polymeric film layer include meltable film-forming substances used alone or in combination, such as polyethylene, methyl polyacrylic acid, polyethylene ethyl acrylate, polyethylene methyl acrylate, acrylonitrile, butadiene, styrene polymer, nylon, polybutylene, polystyrene, polyurethane, polysulfone, polyvinylidene chloride, polypropylene, polymethyl pentene, styrene maleic anhydride polymer, styrene acrylonitrile polymer, ionomers based on sodium or zinc salts of ethylene/methacrylic acid, polymethyl methacrylates, cellulosics, fluoro plastics, polyacrylonitriles, and thermoplastic polyesters.

The present subject matter includes one or more substrates having at least one layer or region of a composition as described herein, deposited thereon. Thus, the present subject matter includes coated substrates or substrates having layers or coatings of the primer or topcoat compositions described herein.

Methods

The present subject matter also provides methods of improving ink or toner anchorage to a substrate surface. The subject matter also provides methods of improving barrier properties of a print receiving surface. The methods comprise applying a layer or coating of a composition according to the present subject matter onto a face or region of a substrate followed by curing of the applied layer, e.g. drying and crosslinking of the composition to thereby form a topcoat on the substrate. The compositions can be applied by known techniques such as by spraying and/or by roller deposition. And drying of the applied coating can also be performed by known techniques. Crosslinking is performed based upon the type of crosslinking agent(s) in the composition. However, for many applications, crosslinking can be performed by exposure to UV light.

In certain applications, it may be beneficial to utilize corona treatments on one or more faces of films or substrates prior to applying the compositions of the present subject matter. For example, prior to applying certain topcoat formulations to polypropylene and/or metalized films, it may be advantageous to utilize 50 to 150 W/m$^2$/min corona treatment to the surface of the films.

Applications

In addition to the various applications and uses described herein, the compositions of the present subject matter can also be utilized in applications involving UV inkjet applications, latex applications, and thermal transfer applications. For example, in UV inkjet applications, the compositions of the present subject matter can be used for forming topcoats on substrates that then receive printing from UV curable inks applied by inkjet printing. Latex applications may involve for example, latex based inks from certain printers that dispense such inks such as certain printers available from Hewlett-Packard. The compositions of the present subject matter can be used for forming topcoats on substrates that then receive printing of latex based inks. And, the present subject matter compositions may also be suitable for forming topcoats which then receive printing from thermal transfer printing methods and/or devices. In particular versions of the present subject matter, the topcoats may exhibit characteristics enabling their use in two or more of these applications, and potentially in further combination with other applications. For example, a topcoat formulation in accordance with the present subject matter and that comprises simple ethylene acrylic acid and crosslinker can be used for both thermal transfer printing and latex based ink printing.

Examples

A series of evaluations were conducted to assess the performance and characteristics of several coating compositions according to the present subject matter. Specifically, three compositions were prepared as noted in Table 2 below. In Table 2, the "AJ-131-X" component is a solution of 5% polyethyleneimine in water having a pH of 10, available from Mica Corp. The "EXP 1232/MP 4990" component is a dispersion of 25% solids of ethylene acrylic acid copolymer in water available from Michelman, Inc. The "CX 100" is an aziridine based crosslinker. And the citrate agent is a buffer agent in the form of Na(II) citrate. The compositions were applied to substrates and topcoats formed. UV Flexo printing performance and HP Indigo printing performance were then assessed as described below.

TABLE 2

Representative Compositions and Performance

| AJ-131-X (5%) | EXP 1232/MP 4990 (25%) | Citrate (1%) | CX 100 | Water | UV Flexo Printing Performance | HP Indigo Printing Performance |
| --- | --- | --- | --- | --- | --- | --- |
| 0.028% | 33.003% | 0.226% | 0.200% | 66.543% | 80% | 100% |
| 0.028% | 32.904% | 0.226% | 0.498% | 66.344% | 60% | 90% |
| 0.028% | 32.741% | 0.225% | 0.990% | 66.016% | 50% | 50% |

UV Flexo printing performance was evaluated as follows. Ink anchorage was determined with a Flexiproof 100 UV testing unit equipped with a banded anilox roller with bands of 3, 4, 5, 6, 8 and 13 cc/m$^2$. The ink used was XSYS Flexocure Gemini, process magenta. Samples were cut to 12.5×10 cm and mounted on the press. Immediately after printing, two strips of Scotch tape 810 were firmly pressed on the printed surface, and left for 5 seconds. The tape was pulled off (180°, as fast as possible) and kept for analysis. Each sample was printed at 80, 50 and 20 m/min. The tape was adhered on a piece of paper, and the paper was scanned (B/W, 300 dpi). The resulting image was analyzed with ImageJ software 2, and the mean gray density of a 170×1000 pixel area was calculated. This resulted in a value between 70 (all ink pulled off) and 255 (no ink pulled off). The ultimate value for ink anchorage was obtained by averaging the values of each tape, at all three speeds (total 6 data points). High values indicate better anchorage. The values presented in Table 2 were converted to percentages based upon 100% corresponding to no ink being pulled off, i.e. a value of 255.

HP Indigo printing performance was performed according to standard HP indigo test format. Ink anchorage was tested by Scotch 810 tape test for film substrates and Scotch 3M 230 tape test for paper substrates. The percentage anchorage was relative. 100% means no ink delamination at all.

As noted in Table 2, the compositions of the present subject matter exhibited good to excellent results in terms of their UV Flexo and HP Indigo printing performance, i.e. at least 50%.

In another set of evaluations, water resistance of the UV Flexo printed samples was assessed by heating UV Flexo printed polypropylene films at 40° C. and 90° C. for 1 hour and 30 minutes, respectively. Ink anchorage was tested using Scotch tape 810. All samples exhibited excellent performance. This was tested for both film and paper substrates. All samples received a score of 10 (on a scale of 1 to 10), with no delamination occurring in any of the samples.

In still another set of evaluations, topcoat coverage was also assessed. This evaluation was performed by depositing standard malachite dye on paper substrates and shirlastein dye on film substrates. All samples exhibited very good coverage.

Many other benefits will no doubt become apparent from future application and development of this technology.

All patents, applications, and articles noted herein are hereby incorporated by reference in their entirety.

As described hereinabove, the present subject matter solves many problems associated with previous strategies, systems or devices. However, it will be appreciated that various changes in the details, materials and arrangements of components and operations, which have been herein described and illustrated in order to explain the nature of the subject matter, may be made by those skilled in the art without departing from the principle and scope of the subject matter, as expressed in the appended claims.

What is claimed is:

1. A composition consisting of:
   0.0005% to 0.25% of at least one polyethyleneimine;
   1.25% to 17.5% of at least one ethylene acrylic acid copolymer or ethylene methacrylic acid copolymer;
   0.001% to 2% of at least one crosslinking agent;
   optionally, at least one agent selected from the group consisting of buffer agents, anti-blocking agents, wetting agents, defoamers, matting agents, antistatic agents, surfactants, and combinations thereof; and
   10% to 95% water,
   wherein the crosslinking agent is a polyfunctionalaziridine crosslinker.

2. The composition of claim 1 wherein the ethylene acrylic acid copolymer or ethylene methacrylic acid copolymer has a weight average molecular weight of from 2,000 to 100,000.

3. The composition of claim 2 wherein the weight average molecular weight is from 2,000 to 50,000.

4. The composition of claim 1 wherein the copolymer has an ethylene content of 60% to 95%.

5. The composition of claim 1 wherein the copolymer has an acrylic acid or methacrylic acid content of 5% to 35%.

6. A composition consisting of:
   0.0005% to 0.1% of at least one polyethyleneimine;
   6.25% to 10% of at least one ethylene acrylic acid copolymer or ethylene methacrylic acid copolymer;
   0.01% to 2% of at least one crosslinking agent;
   optionally, at least one agent selected from the group consisting of buffer agents, anti-blocking agents, wetting agents, defoamers, matting agents, antistatic agents, surfactants, and combinations thereof; and
   50% to 85% water,
   wherein the crosslinking agent is a polyfunctionalaziridine crosslinker.

7. The composition of claim 6 wherein the ethylene acrylic acid copolymer or ethylene methacrylic acid copolymer has a weight average molecular weight of from 2,000 to 100,000.

8. The composition of claim 7 wherein the weight average molecular weight is from 2,000 to 50,000.

9. The composition of claim 6 wherein the copolymer has an ethylene content of 60% to 95%.

10. The composition of claim 6 wherein the copolymer has an acrylic acid or methacrylic acid content of 5% to 35%.

11. A composition consisting of:
    0.0005% to 0.25% of at least one polyethyleneimine;
    1.25% to 17.5% of at least one ethylene acrylic acid copolymer or ethylene methacrylic acid copolymer;
    0.001% to 2% of at least one crosslinking agent;
    at least one agent selected from the group consisting of buffer agents, anti-blocking agents, wetting agents, defoamers, matting agents, antistatic agents, surfactants, and combinations thereof; and
    10% to 95% water,
    wherein the crosslinking agent is a polyfunctionalaziridine crosslinker.

12. A composition consisting of:
    0.0005% to 0.1% of at least one polyethyleneimine;
    6.25% to 10% of at least one ethylene acrylic acid copolymer or ethylene methacrylic acid copolymer;
    0.01% to 2% of at least one crosslinking agent;
    at least one agent selected from the group consisting of buffer agents, anti-blocking agents, wetting agents, defoamers, matting agents, antistatic agents, surfactants, and combinations thereof; and
    50% to 85% water,
    wherein the crosslinking agent is a polyfunctionalaziridine crosslinker.

* * * * *